US008953687B2

(12) United States Patent
Morphet et al.

(10) Patent No.: US 8,953,687 B2
(45) Date of Patent: Feb. 10, 2015

(54) VIDEO INTERPOLATION

(75) Inventors: Stephen Morphet, St. Albans (GB); Steven Fishwick, Kings Langley (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 334 days.

(21) Appl. No.: 13/066,960

(22) Filed: Apr. 28, 2011

(65) Prior Publication Data

US 2011/0268190 A1    Nov. 3, 2011

(30) Foreign Application Priority Data

Apr. 30, 2010  (GB) .................................. 1007351.8

(51) Int. Cl.
*H04B 1/66*  (2006.01)
*H04N 7/01*  (2006.01)

(52) U.S. Cl.
CPC .............. *H04N 7/014* (2013.01); *H04N 7/0127* (2013.01)
USPC .................................................. 375/240.16

(58) Field of Classification Search
CPC ............................. H04N 7/014; H04N 7/0127
See application file for complete search history.

(56) References Cited

U.S. PATENT DOCUMENTS

| | | | | | |
|---|---|---|---|---|---|
| 5,214,751 | A | * | 5/1993 | Robert ........................... | 345/606 |
| 5,353,119 | A | * | 10/1994 | Dorricott et al. .............. | 348/446 |
| 5,363,146 | A | * | 11/1994 | Saunders et al. .............. | 348/699 |
| 5,745,183 | A | * | 4/1998 | Lam ........................... | 375/240.15 |
| 6,049,362 | A | * | 4/2000 | Butter et al. .................. | 348/699 |
| 6,088,397 | A | * | 7/2000 | Jeannin ....................... | 375/240.16 |
| 6,438,275 | B1 | * | 8/2002 | Martins et al. ............... | 382/300 |
| 6,931,062 | B2 | * | 8/2005 | Zhong ......................... | 375/240.12 |
| 7,440,619 | B2 | * | 10/2008 | Mishima et al. .............. | 382/209 |
| 7,492,819 | B2 | * | 2/2009 | Honda et al. ............. | 375/240.03 |
| 2007/0229703 | A1 | | 10/2007 | Lu | |

FOREIGN PATENT DOCUMENTS

| | | |
|---|---|---|
| EP | 1 843 587 A1 | 10/2007 |
| EP | 1 855 474 A1 | 11/2007 |
| WO | WO 2008/035063 A2 | 3/2008 |

OTHER PUBLICATIONS

International Preliminary Report on Patentability and Written Opinion of the International Searching Authority, issued in PCT/GB2011/000650 dated Jun. 28, 2011 (12 sheets).
"A Method for Motion Adaptive Frame Rate Up-Conversion", by Roberto Castagno, et al., IEEE Transactions on Circuits and Systems for Video Technology, vol. 6, No. 5, Oct. 1996 (11 pages).
United Kingdom Search Report dated Jul. 21, 2011 (6 pages).

* cited by examiner

*Primary Examiner* — Dave Czekaj
*Assistant Examiner* — MD Haque
(74) *Attorney, Agent, or Firm* — Michael S. Garrabrants

(57) ABSTRACT

A method and apparatus are provided for motion compensated video interpolation. Each field or frame in a sequence of video images is subdivided into a plurality of blocks and a motion vector field is derived using block matching for a current video field using data matched to a previous video field or frame. A first time instance is determined at which an interpolated block is to be displayed and a second time instance is determined at which a corresponding interpolated block is to be created. Video data for each block is interpolated at its second time instance for each block and is then output for display at the first time instance.

15 Claims, 13 Drawing Sheets

Previous Input Frame
(t=-1)

Current Input Frame
(t=0)

A typical block matching motion estimator

A typical block matching motion estimator

Choosing a vector from a set of candidate vectors

Interpolation time instances for 2x frame rate conversion

Interpolation time instances for 2.5x frame rate conversion

Weighted blend interpolation of pixels

Conventional interpolation of output frames at 2x the input frame rate

Conventional interpolation of output frames at 2x the input frame rate in the presence of a non-true motion vector

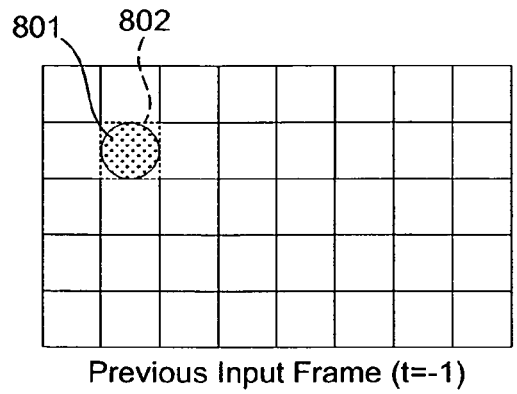
Previous Input Frame (t=-1)
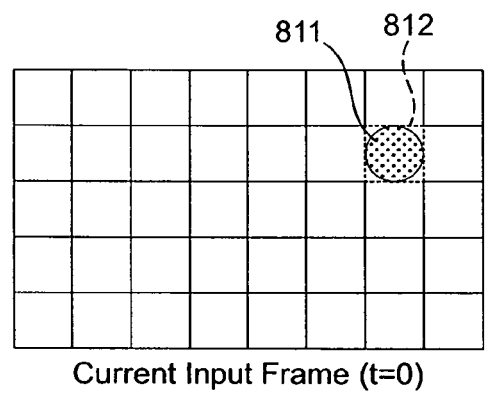
Current Input Frame (t=0)
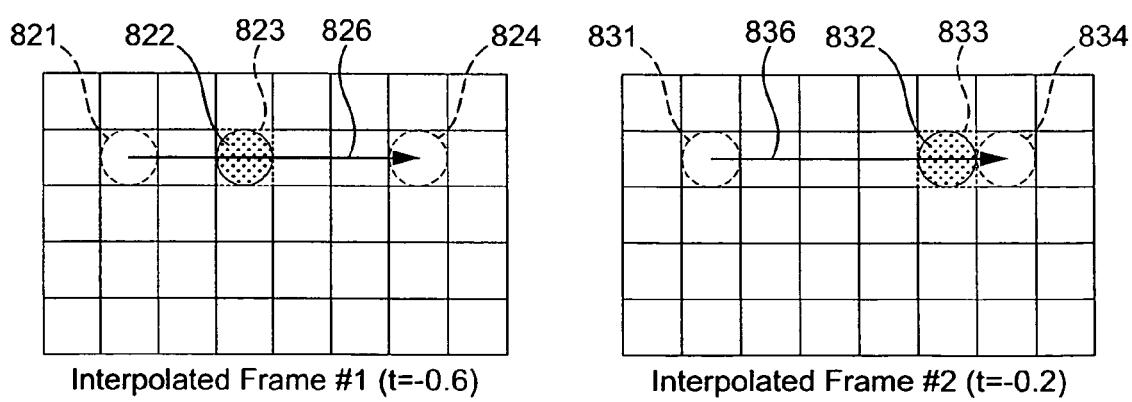
Interpolated Frame #1 (t=-0.6)    Interpolated Frame #2 (t=-0.2)
Frame interpolation for 2.5x motion compensated frame interpolation
FIG. 8

Interpolation time instances for 2x frame rate converstion with a working scale factor of ½

Interpolation time instances for 4x frame rate converstion with a working scale factor of ½ using various methods of time instance shifting Interpolation of output frames at 2x the input frame rate in the presence of a non-true motion vector and a working scale factor of ½

A) Input Frames:

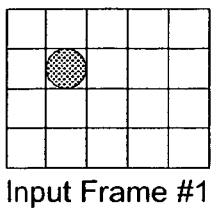
Input Frame #1

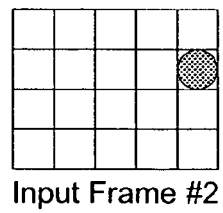
Input Frame #2

B) Interpolation using true motion vector:

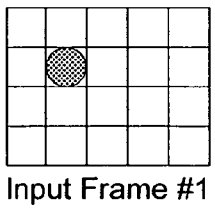
Input Frame #1

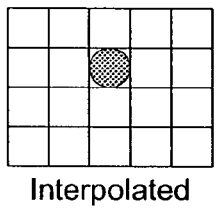
Interpolated Frame #1

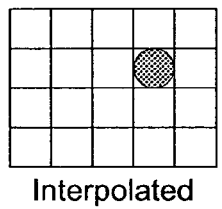
Interpolated Frame #2

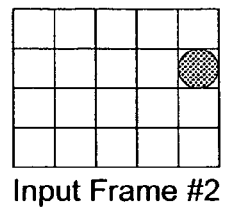
Input Frame #2

C) Interpolation using non-true motion vectors at ideal time instances:

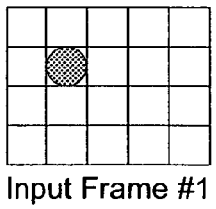
Input Frame #1

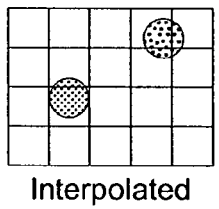
Interpolated Frame #1

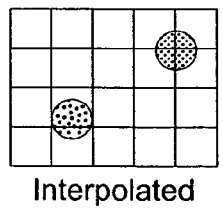
Interpolated Frame #2

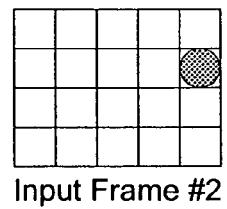
Input Frame #2

D) Interpolation using non-true motion vectors at working scale factor ½:

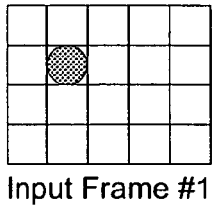
Input Frame #1

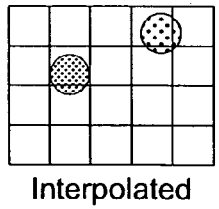
Interpolated Frame #1

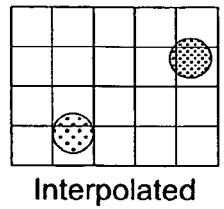
Interpolated Frame #2

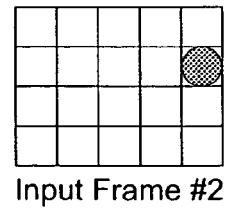
Input Frame #2

Interpolation comparison of output frames at 3x the input frame rate using various motion compensated interpolation methods

FIG. 12

Choosing a working scale factor for interpolation based on the performance of the motion estimator Choosing a working scale factor using for interpolation based on the performance of the motion estimator and a clamping scale factor Block diagram showing a motion compensated frame rate conversion system Block diagram showing a motion compensated frame rate conversion system modified to include varying temporal interpolation

VIDEO INTERPOLATION

FIELD OF THE INVENTION

This invention relates to motion compensated video interpolation systems, and in particular to methods and apparatus associated with reducing the visibility of artefacts in motion compensated video interpolation.

BACKGROUND TO THE INVENTION

Video sequences typically comprise a series of non interlaced frames of video data, or a series of interlaced fields of video data. Interlaced sequences are produced by fields which carry data on alternate lines of a display, such that a first field will carry data for alternate lines, and a second field will carry data for the missing lines. The fields are thus spaced both temporally and spatially. Every alternate field in a sequence will carry data at the same spatial locations. A pair of interlaced field may be referred to as a frame and a non-interlaced field may also be referred to as a frame. Embodiment of this invention will be described in terms of a non-interlaced system, but the invention is equally applicable to systems processing either interlaced or non-interlaced video data.

Identification of motion in video sequences is well known and results in a motion vector for each pixel, or group of pixels that describes the motion between one frame and another. A well-known motion estimation method based on block matching techniques will be used to illustrate the invention, although other types of motion estimator would be equally suitable. Block based motion estimation methods generally consider two consecutive frames from a video sequence and subdivide them into multiple regions known as blocks or macroblocks. In a motion search procedure, each block is compared with pixel data from various candidate locations in the previous frame. The relative position of the best match gives a vector that describes the motion in the scene at that block position. Collectively, the set of motion vectors at each block position in a frame is known as the motion vector field for that frame. Note that use of the term "vector field" should not be confused with the use of "field" or "video field" to describe the data in an interlaced video sequence.

FIG. 1 illustrates a typical example of a block matching motion estimator. In all figures, including FIG. 1, motion vectors are shown with the head of the arrow at the centre of the block to which the vector corresponds. The frames are divided into blocks, and an object 101 in the previous frame has moved to position 102 in the current frame. The previous position of the object is shown superimposed on the current frame as 103. Motion estimation is performed for blocks rather than for objects, where a block of pixels in the current frame is matched with a block sized pixel area in the previous frame which is not necessarily block aligned. For example, block 104 is partially overlapped by the moving object 102, and has contents as illustrated at 105. Motion estimation for block 104, if it performs well, will find the pixel data area 106 in the previous frame, which can also be seen to contain the pixels illustrated in 105, i.e. a good match has been found. Superimposed back onto the current frame, the matching pixel data area is at 107. The motion vector associated with block 104 is therefore as illustrated by arrow 108.

Many block based motion estimators select their output motion vector by testing a set of motion vector candidates with a method such as a sum of absolute differences (SAD) or mean of squared differences (MSD), to identify motion vectors which give the lowest error block matches. FIG. 2 illustrates the candidate evaluation process for the block 201 in the current frame which has pixel contents shown in 211. In this simple example system, three motion vector candidates 206, 207 and 208 are considered which correspond to candidate pixel data areas at locations 202, 203 and 204 in the previous frame. The pixel contents of these pixel data areas can be seen in 212, 213 and 214 respectively. It is apparent that the pixel data at location 202 provides the best match for block 201 and should therefore be selected as the best match/lowest difference candidate. Superimposed back onto the current frame, the matching pixel data area is at 205 and the associated motion vector is 206.

Different systems have different requirements of the motion estimation. In a video encoder, the requirement is to form the most compact representation of a frame, by reference to a previous frame from the sequence. The requirement is generally to find motion vectors which give the lowest error block matches, and while the resulting motion vectors are usually representative of the actual motion of objects in the scene, there is no requirement that this is always the case. In other applications, such as de-interlacing or frame rate conversion, it is more important that the motion vectors represent the true motion of the scene, even if other distortions in the video mean that the block matches do not always give the lowest error. By applying appropriate constraints to the candidate motion vectors during motion search, the results can be guided towards "lowest error" or "true motion" as necessary.

Frame rate conversion systems are also well known. In such a system, a sequence of input fields or frames at an input frame rate is changed to a different output frame rate. Conventionally this is done by repeating and/or dropping frames until the desired output frame rate is achieved. An alternative method that results in smoother output motion is called motion compensated frame interpolation. In a motion compensated frame interpolation system, motion estimation is used to determine motion vectors that represent the true motion of objects in a scene and these motion vectors are used to create additional frames in which moving objects are represented at the correct intermediate positions. We describe the temporal position of a frame, with respect to the original frames of the input sequence, as the time instance of the frame. For a frame rate doubling application, where an interpolated frame is required at the temporal midpoint between two input frames at t=−1 and t=0, the time instance of the interpolated frame is at t=−0.5.

Motion compensated frame interpolation systems require the creation of intermediate frames between the two input frames. The temporal position at which each interpolated frame must be output is known from the input and output frame rates and is called the "ideal time instance" of the frame. In a conventional motion compensated frame interpolation system, each interpolated frame is created using the ideal time instance to determine the intermediate positions of objects in the scene.

A block diagram of a frame rate conversation system is shown in FIG. 15. The system comprises a video input 1501 which goes to a memory 1502 to store the input frame history and also to a motion estimation unit 1503 which performs motion estimation by comparing the current input frame from the video input 1501 with a previous frame from the memory 1502. Motion vectors are sent to an interpolation unit 1504 which constructs an interpolated frame from the input frames and provides a video output 1507. Knowing the motion vectors allows the interpolation unit 1504 to place pixels such that objects in the interpolated frame appear in the appropriate positions according to the trajectory of their motion. A timing control unit 1505 calculates the ideal time instances for the interpolated output frames. An image analysis unit

1506 may also analyse the input frame data to detect events such as scene changes and cross-fades where motion estimation is known to struggle. In these situations it is preferable to set the ideal time instances to t=−1 and thereby repeat the original input frame.

FIG. 3 illustrates an example frame rate conversion system where three input frames are used to create an output sequence with double the number of output frames. Output 1 can be seen to be a direct copy of the frame provided as Input 1. Output 2 must be created at the temporal midpoint between the Input 1 time instance and the Input 2 time instance. Output 3 can be seen to be a direct copy of the frame provided as Input 2. Output 4 must be created at the temporal midpoint between the Input 2 time instance and the Input 3 time instance. Output 5 can be seen to be a direct copy of the frame provided as Input 3.

FIG. 4 illustrates an example frame rate conversion system where 3 input frames are used to create an output sequence with 2.5× the number of output frames. Output 1 can be seen to be a direct copy of the frame provided as Input 1. Output 2 must be created at a time instance ⅖ of the way between Input 1 and Input 2. Output 3 must be created at a time instance ⅘ of the way between Input 1 and Input 2. Input 2 is not shown in the output sequence. Output 4 must be created at a time instance ⅕ of the way between Input 2 and Input 3. Output 5 must be created at a time instance ⅗ of the way between Input 2 and Input 3. Output 6 can be seen to be a direct copy of the frame provided as Input 3.

Various schemes exist for creating each block of pixels in an interpolated output frame. Where motion estimation has identified a perfect match between areas of pixel data in the input frames, interpolation may be as simple as copying pixels from one of the input frames to a position in the interpolated frame that is determined by the motion vector and the time instance of the interpolated frame. Where the match identified by motion estimation is not perfect, it is necessary to generate the block of pixels in the interpolated output frame from some combination of the pixel data from the input frames. Detailed description of appropriate methods is beyond the scope of this application, but will be known to those skilled in the art. A simple method suitable for illustrating the concept of this invention is the use of a weighted blend between the motion compensated pixel data from the two adjacent input frames.

FIG. 5 illustrates a weighted blend interpolation system. Each pixel value in an interpolated pixel area can be considered to be an interpolation between the pixel values from the corresponding locations in the pixel data areas at the motion compensated positions in the adjacent input frames. In FIG. 5, an interpolation between a black pixel (A) from the previous input frame and a white pixel (B) from the current input frame is required. The interpolated pixel at an intermediate time instance between the input frames can be created by an appropriate weighted blend between the black pixel and the white pixel. A suitable weighting function is to use the fractional time instance of the interpolated frame relative to the time instances of the input frames. For example, if the interpolated frame's time instance is located one quarter of the temporal distance between the previous input frame (containing pixel A) and the current input frame (containing pixel B), the interpolated pixel should use a 75% contribution from pixel A and a 25% contribution from pixel B, i.e. a ¾:¼ blend between the pixel A and pixel B. If the interpolated pixel was created at the midpoint between the two frames, an equal contribution from each pixel would be used, i.e. a ½:½ blend between the pixel A and pixel B.

The quality of interpolated frames produced by motion compensated frame interpolation is largely dependent upon the performance of the motion estimator. In situations where the motion estimator performs badly, and produces non-true motion vectors, interpolation using these poor vectors causes artefacts. Poor motion vectors may arise due to complex or erratic motion, objects being occluded/revealed between input frames, aliasing, or objects being scaled or rotated so that they cannot be described by a simple translation of pixels from one area of the screen to another.

FIG. 6 illustrates a conventional motion compensated frame interpolation system that creates output frames at double the input frame rate. In this example, the previous input frame's time instance is t=−1 and the current input frame's time instance is t=0, i.e. 100% of the input frame time interval. The motion vector that describes the motion of the object from position 601 to position 602 during this interval is shown as 603. Other vectors in the motion vector field have been omitted for clarity. As interpolated frames must be output at the time instance halfway between the input frame time instances position, i.e. at 50% of the input frame time interval, the ideal time instance is known to be t=−0.5 and the object's position at that time instance can be interpolated at a position half way along the motion vector, as shown at 604. The pixel data required to represent the object in the block sized pixel area 614 is created by interpolating between the block sized pixel area 611 (contents shown as 611-A) and the block of pixels 612 (contents shown as 612-A). The 50% blend result determined by the ideal time instance, between 611-A and 612-A is shown as 614-A. This method works well when the motion vector describing the movement of the object over an input frame interval accurately describes the true motion of an object. The resulting objects are smoothly interpolated with linear position between their positions in the previous input frame to their positions in the current input frame.

FIG. 7 illustrates a conventional motion compensated frame interpolation system that creates output frames at double the input frame rate in a case where motion estimation has performed poorly. In this example, the previous input frame's time instance is t=−1 and the current input frame's time instance is t=0. The motion vector that describes the true motion of the object from position 701 to position 702 during this interval could not be accurately determined by the motion estimator (for some reason). In place of the true motion vector, the motion estimator introduced the non-true motion vectors shown as 703 and 704. Again, other vectors in the motion vector field have been omitted for clarity. As interpolated frames must be output at the time instance halfway between the input frames the ideal time instance is t=−0.5. The object will therefore be interpolated at positions half way along the motion vectors 703 and 704. Interpolating along the motion vector 703, a block sized pixel area 715 is created by interpolating between the block sized pixel area 711 (containing the object pixels as shown in 711-A) and the block of pixels 722 (containing the background pixels as shown in 722-A). The result of the 50% blend between block sized pixel areas 711-A and 722-A is shown as 715-A as a ½:½ blend between the object and the background pixels. Interpolating along the motion vector 704, a block sized pixel area 716 is created by interpolating between the block sized pixel area 721 (containing the background pixels shown in 721-A) and the block of pixels 712 (containing the object pixels shown in 712-A). The result of the 50% blend between block sized pixel areas 721-A and 712-A is shown as 716-A as a ½:½ blend between the object and the background pixels. The interpolated frame now includes two interpolated versions of the original object, with a different opacity to the object in the input frames, and located in the wrong position. Interpolation using non-true motion vectors therefore causes significant visual artefacts in interpolated frames.

FIG. 8 illustrates how motion compensated frame interpolation can be used to generate two intermediate frames between a pair of input frames, at time instances other than the midpoint between the two input frames. This is suitable for an application such as 2.5× frame rate conversion. Object 801 in the previous frame has moved to position 811 in the current frame. The previous object position is superimposed on the interpolated frames as 821 and 831, and the current position of the object is superimposed on the interpolated frames as 824 and 834. Motion estimation has performed well, and the motion vector describing the motion of the object between input frames is shown as 826 and 836. In order to increase the frame rate it is necessary to create interpolated frames at fractional points between the time instance of the previous input frame and the time instance of the current input frame. In the example shown of the first span in a 2.5× frame rate conversion, it is necessary to create interpolated frames at ⅖ and ⅘ of the time instance span (i.e. t=−0.6 and t=−0.2). Assuming linear interpolation of object position it can be expected that in the first interpolated frame, the object will have moved ⅖ of the distance along the path defined by the motion vector 826 at the ⅖ time instance between the input frames. The interpolated block sized area of pixels at position 823 in the first interpolated frame can therefore be created by interpolation between the block sized pixel area 802 and the pixels in block 812 with a blend of ⅗ from the previous input frame and ⅖ from the current input frame. Similarly, assuming linear interpolation of object position, it can be expected that in the second interpolated frame the object will have moved ⅘ of the distance along the path defined by the motion vector 836 at the ⅘ time instance between the input frames. The interpolated block sized area of pixels at position 833 in the second interpolated frame can therefore be created by interpolation between the block sized pixel area 802 and the pixels in block 812 with a blend of ⅕ from the previous input frame and ⅘ from the current input frame.

To improve visual quality of motion compensated interpolation systems it is desirable to minimize the visibility of artefacts that arise in regions of poor motion estimation.

SUMMARY OF THE INVENTION

Preferred embodiments of the present invention provide apparatus and methods associated with reducing the visibility of artefacts in motion compensated frame interpolation by varying the temporal position used in the creation of the interpolated frame relative to the temporal position at which it is displayed.

BRIEF DESCRIPTION OF THE DRAWINGS

Preferred embodiments of the invention will now be described in detail by way of reference to the accompanying drawings in which:

FIG. 8 illustrates prior art object interpolation for 2.5× frame rate conversion using true motion vectors.

FIG. 12 shows a comparison of frame interpolation artefacts before and after the application of the varying temporal interpolation method.

DETAILED DESCRIPTION OF PREFERRED EMBODIMENTS

Embodiments of this invention provide a modification to motion compensated frame interpolation systems that is capable of reducing the visibility of artefacts in interpolated frames. In a conventional motion compensated frame interpolation system, the time instance at which an output frame is output in the sequence is used to determine the position of the objects in the interpolated scene. It is proposed that while an interpolated frame should still be output at the time instance at which it is required (the "ideal time"), a second "working time instance" may be used to assist with calculation of the position of objects in the screen. Conveniently, the working time instance may be defined as the ideal time instance modified by a "working scale factor". This brings the time instance at which the frame is interpolated closer to that of an input frame. This should reduce the effect of any erratic motion vectors and provide an output with fewer artefacts which can then be used at the ideal time.

Figure 9:
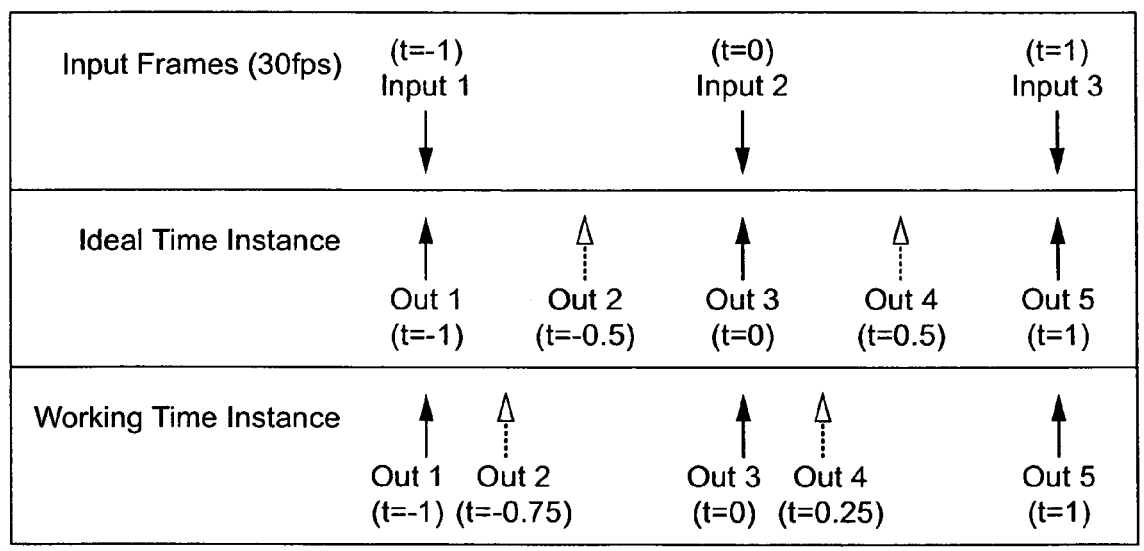
FIG. 9 illustrates the required interpolation time instances and working time instances for a 2× frame rate conversion with a working scale factor of ½.

FIG. 9 illustrates an example frame rate conversion system where three input frames are used to create an output sequence with the output frame rate being twice the input frame rate. Output 1 can be seen to be a direct copy of the frame provided as Input 1. Output 2 must be output at the ideal time instance t=−0.5 which is half way between the Input 1 time instance and the Input 2 time instance. However, the working time instance for interpolation of Output 2 is scaled back from the ideal time instance by a working scale factor of 0.5. If we assume, for example, a scaling function that determines a working time instance by multiplying the ideal time instance by the working scale factor, this results in the output frame being interpolated as if it was at a time instance one quarter of the way between the Input 1 time instance and the Input 2 time instance. The working time instance for Output 2 is therefore t=−0.75. Output 3 can be seen to be a direct copy of the frame provided as Input 2. Output 4 must be output at the ideal time instance t=0.5 which is half way between the Input 2 time instance and the Input 3 time instance. The working time instance for interpolation of Output 4 is scaled back from the ideal time instance by a working scale factor of 0.5. This results in the output frame being interpolated as if it was at a time instance one quarter of the way between the Input 2 time instance and the Input 3 time instance. The working time instance for Output 4 is therefore t=0.25. Output 5 can be seen to be a direct copy of the frame provided as Input 3.

In the above example, the working scale factor is always used to shift the working time instance towards a previous input frame's time instance. It is also possible to apply the method to shift the working time instance towards a current input frame's time instance or to shift the working time instance towards a nearest input frame's time instance.

Figure 10:
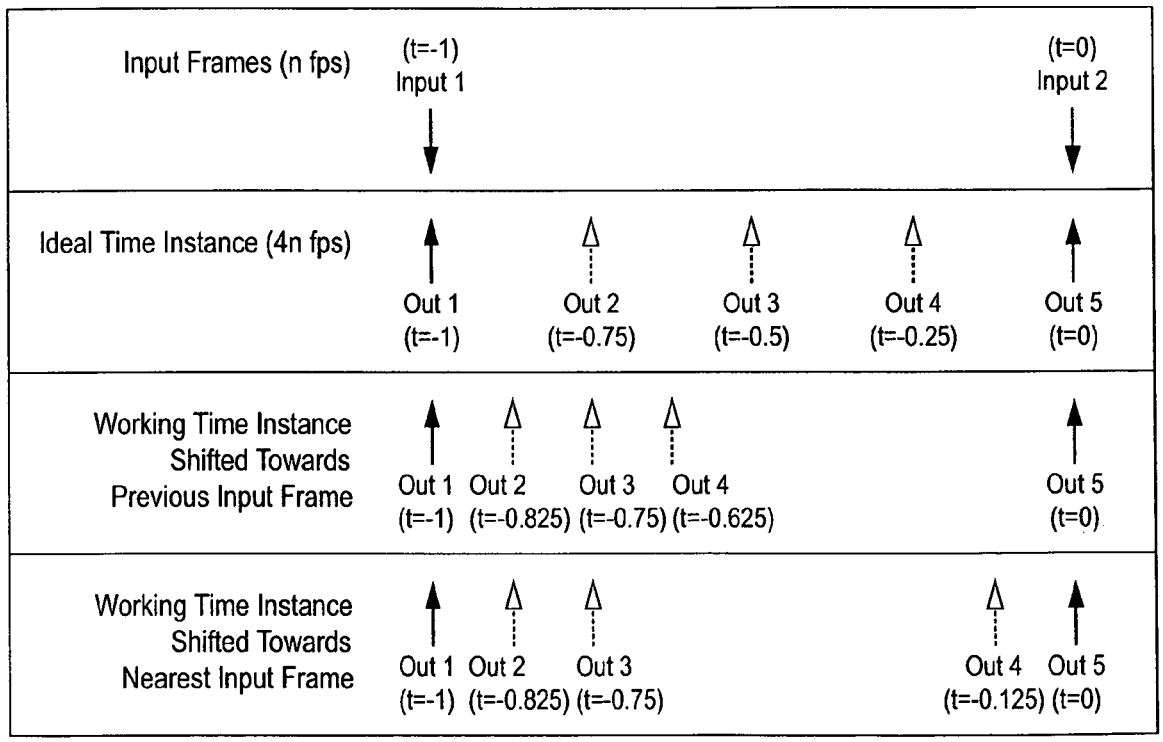
FIG. 10 illustrates the required interpolation time instances and working time instances for a 4× frame rate conversion with a working scale factor of ½ using various methods of time instance shifting.

FIG. 10 illustrates how a working scale factor of 0.5 may be used to shift the working time instances towards the time instance of the input frames using various methods of time instance shifting. The example frame rate conversion system shown interpolates between two input frames (at t=−1 and t=0) to create an output sequence with four times the number of output frames. The first and last output frames can be seen to be direct copies of the frames provided as Input 1 and Input 2 respectively and are displayed at the input frame time instances. The ideal time instances of the interpolated output frames are at t=−0.75, t=−0.5 and t=−0.25. With a working scale factor of 0.5 and time instances shifted towards the previous input frame, the working time instances can be calculated by multiplying the ideal time instance by the working scale factor. This gives working time instances sequentially located at temporal positions t=−0.825, t=−0.75, and t=−0.625. The largest temporal distance between an input frame time instance and an interpolated frame time instance is 0.375 of the input frame period and the largest interval between consecutive working time instances is 0.625 of the input frame period.

Instead of simply being calculated as the product of time instance and working scale factor, the working time instance can be calculated so that the working time instances are shifted towards the input frame that is nearest to the interpolated frame's ideal time instance. The working time instances can now be seen to be sequentially located at temporal positions t=−0.875, t=−0.75, and t=−0.125. The largest temporal distance between an input frame time instance and an interpolated frame time instance is now reduced to 0.25 of the input frame period while the largest interval between consecutive working time instances remains at 0.625. As will be discussed, a reduced largest temporal distance between an input frame time instance and an interpolated frame time instance results in less visible artefacts in the interpolated frame. Also, by maintaining the same interval between consecutive working time instances the perceived smoothness of the output video sequence is unaffected.

Figure 1:
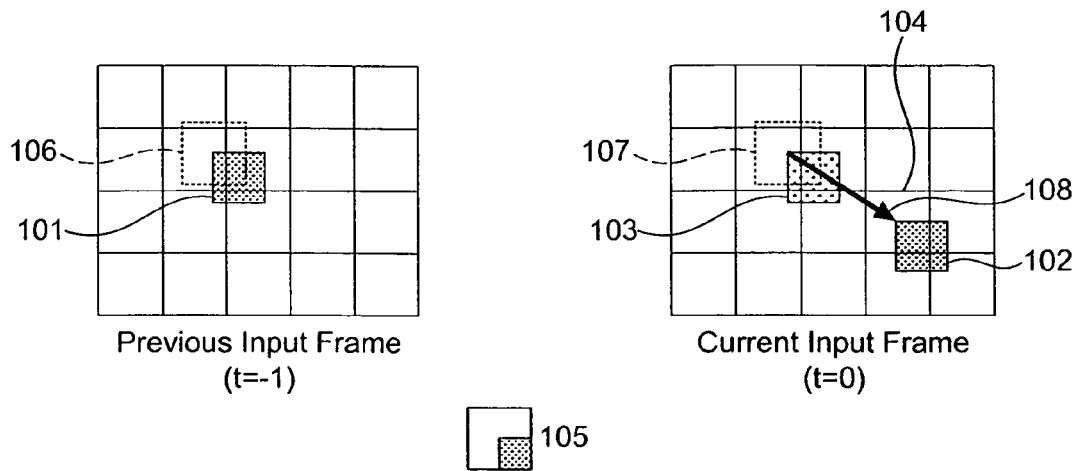
FIG. 1 illustrates a typical prior art block matching motion estimator.
Figure 2:
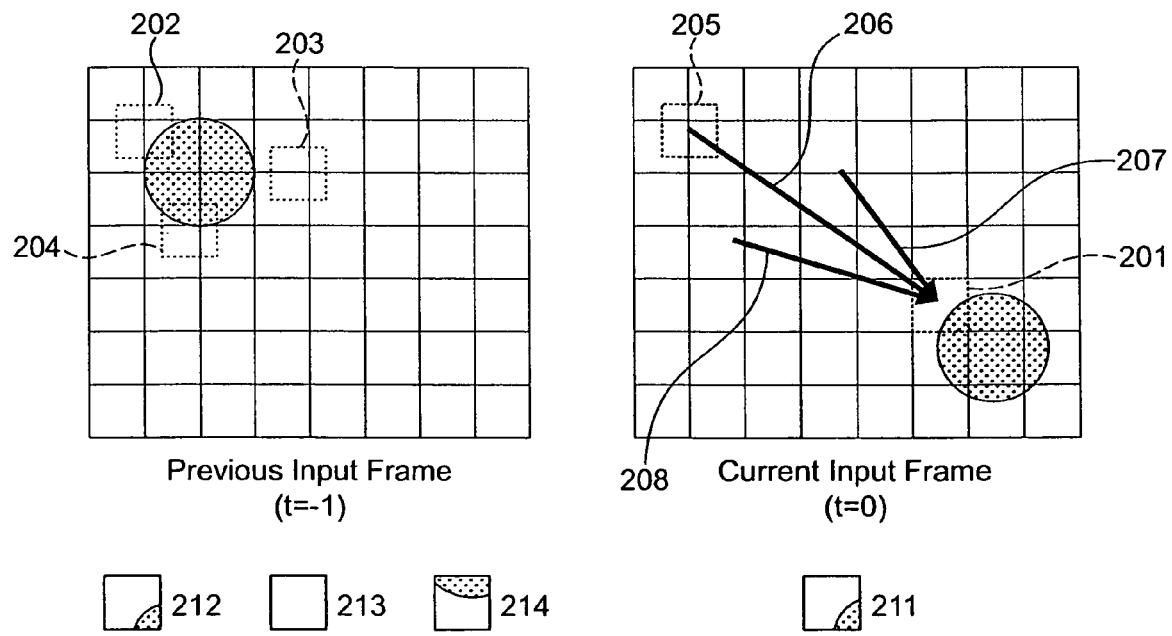
FIG. 2 illustrates a prior art comparison between candidate motion vectors.
Figure 3:
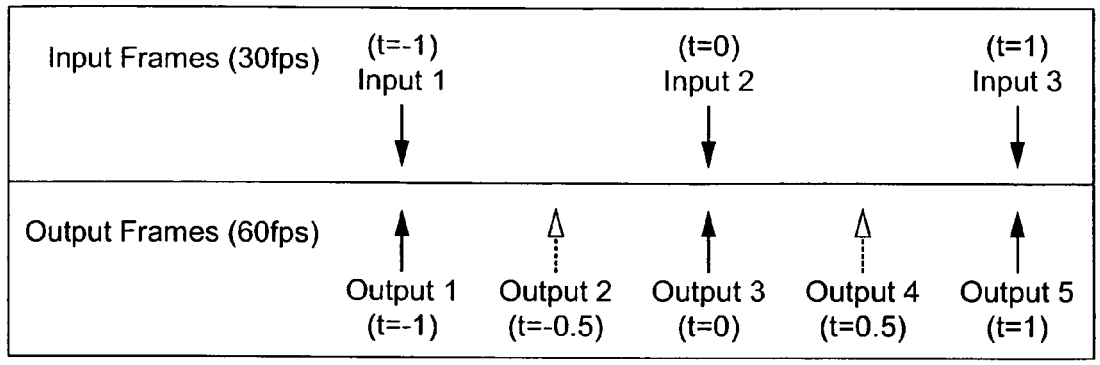
FIG. 3 illustrates the required interpolation time instances for a 2× frame rate conversion.
Figure 4:
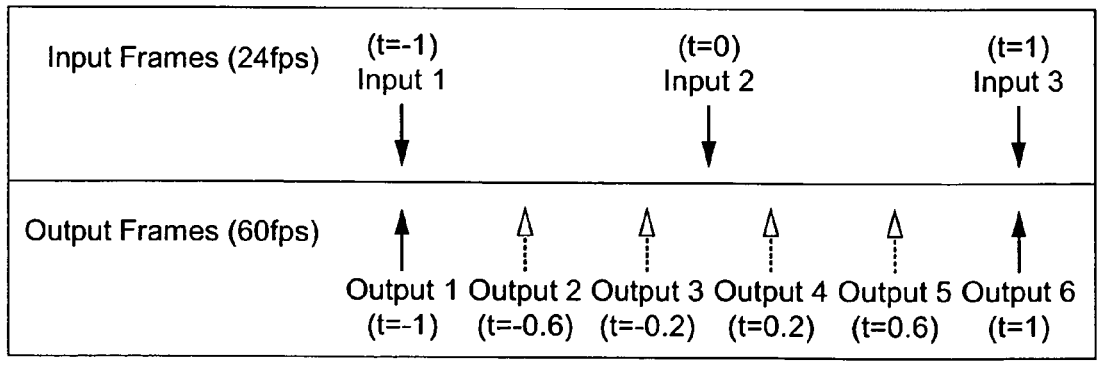
FIG. 4 illustrates the required interpolation time instances for a 2.5× frame rate conversion.
Figure 5:
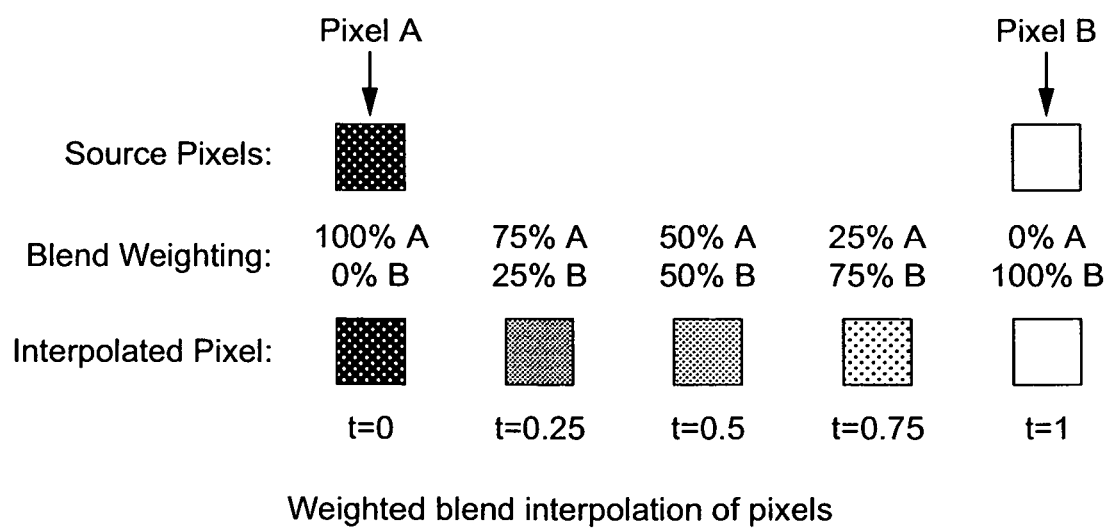
FIG. 5 illustrates an example prior art pixel interpolation system using weighted blending between source pixels.
Figure 6:
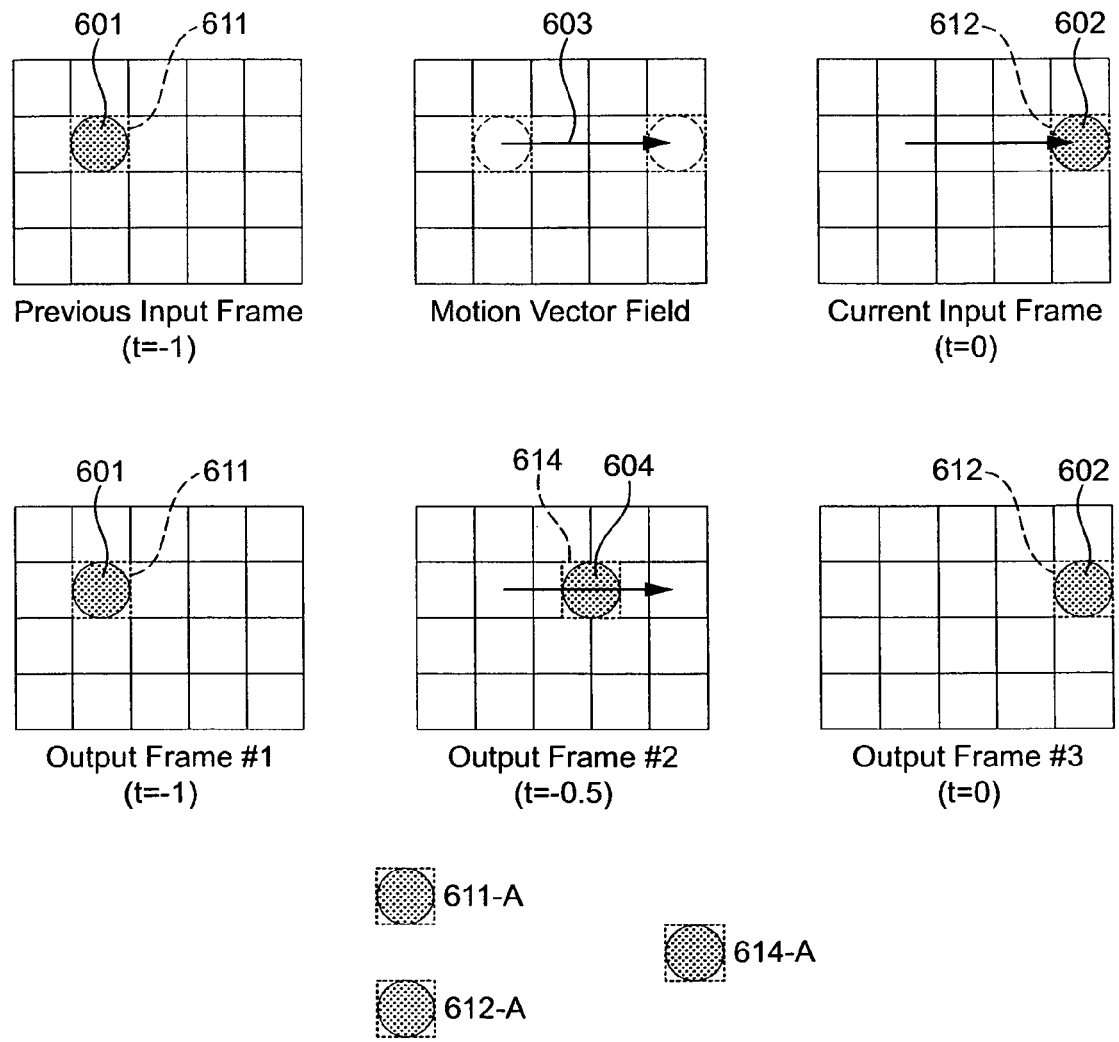
FIG. 6 illustrates prior art object interpolation for a 2× frame rate conversion using true motion vectors.
Figure 7:
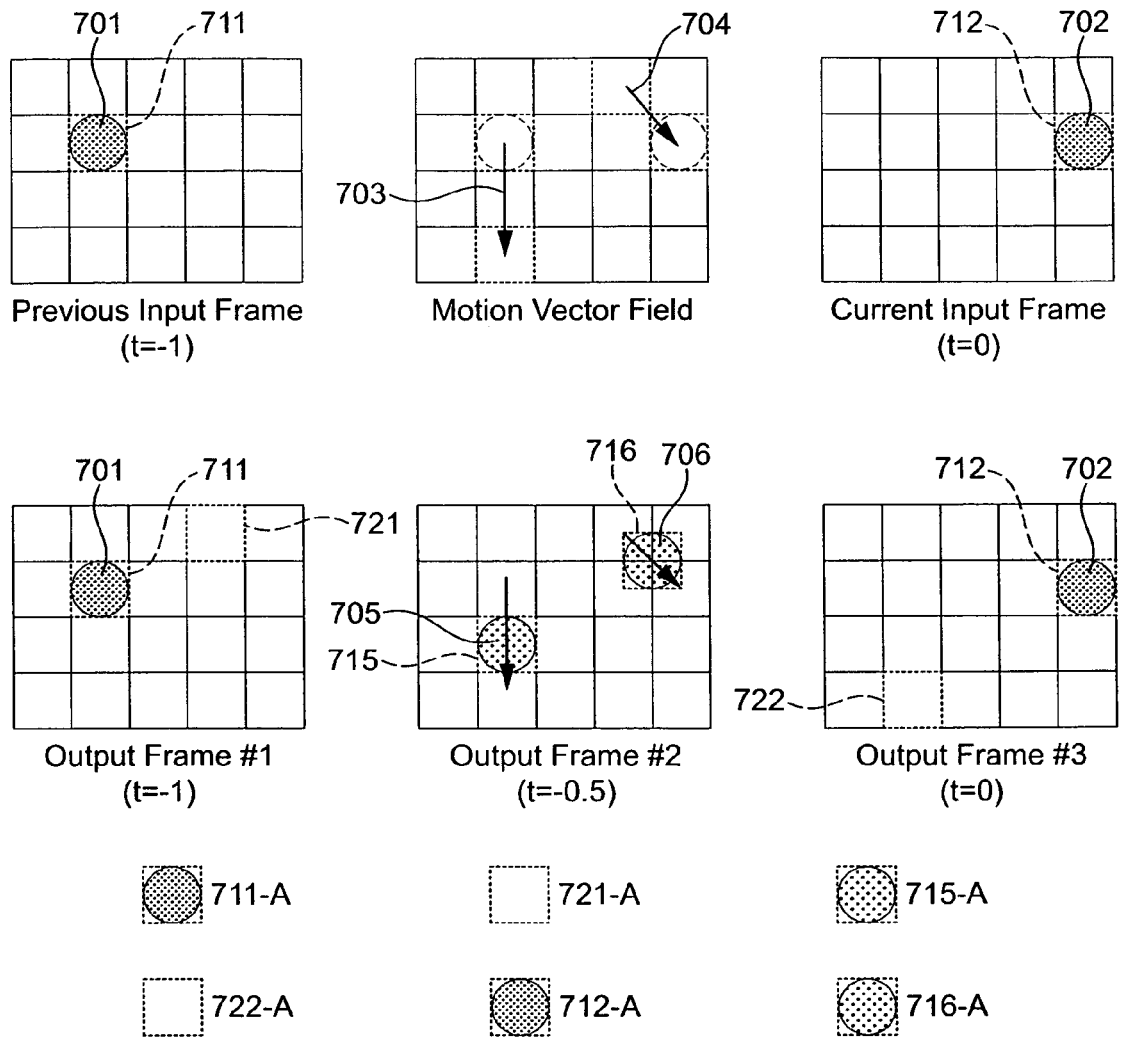
FIG. 7 illustrates prior art object interpolation for a 2× frame rate conversion using non-true motion vectors.
Figure 11:
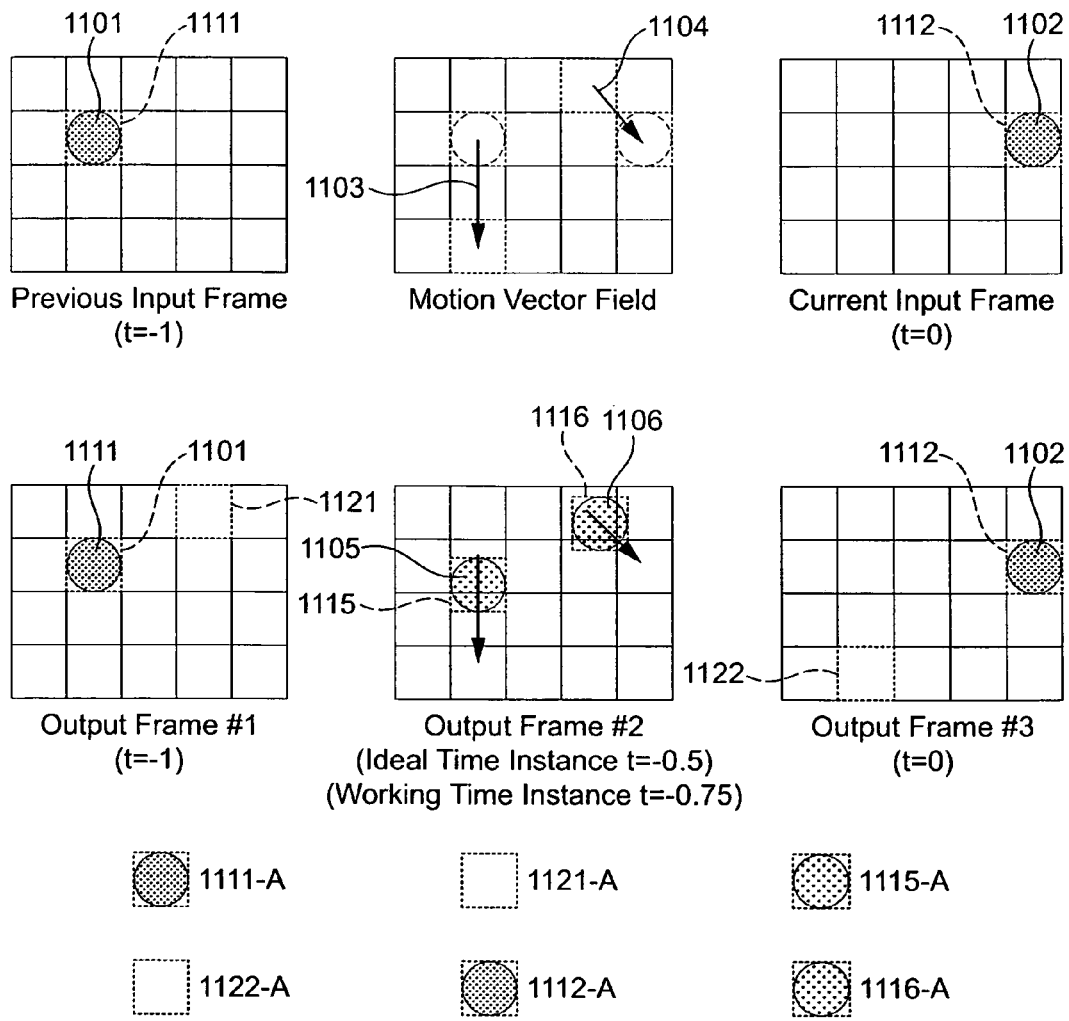
FIG. 11 illustrates object interpolation for a 2× frame rate conversion using non-true motion vectors with the varying temporal interpolation method applied.

FIG. 11 shows the example previously illustrated in FIG. 7 with the introduction of a working scale factor of 0.5 to shift the working time instances towards the previous frame. In this example, the previous input frame's time instance is t=−1 and the current input frame's time instance is t=0. The motion vector describing the true motion of an object from position 1101 to position 1102 during this interval could not be accurately determined by the motion estimator (for some reason). In place of the true motion vector, the motion estimator generated the non-true motion vectors shown as 1103 and 1104. Other vectors in the motion vector field have been omitted for clarity. An ideal time instance of t=−0.5 and a working scale factor of 0.5 give rise to a working time instance of t=−0.75 for the interpolated frame. In order to interpolate at this working time instance, the object must be interpolated at a position one quarter of the way along the motion vectors 1103 and 1104. Interpolating along the motion vector 1103, a block sized pixel area 1115 is created by interpolating between the block sized pixel area 1111 (containing the object pixels shown in 1111-A) and the block of pixels 1122 (containing the background pixels shown in 1122-A). The blended result between 1111-A and 1122-A is determined by the working time instance to use 25% from the previous input frame and 75% from the current input frame. The result is shown as 1115-A as a ¾:¼ blend between the object and the background pixels. Interpolating along the motion vector 1104, a block sized pixel area 1116 is created by interpolating between the block sized pixel area 1121 (containing the background pixels shown in 1121-A) and the block of pixels 1112 (containing the object pixels shown in 1112-A). The blended result between 1121-A and 1112-A is determined by the working time instance to use 75% from the previous input frame and 25% from the current input frame. This result is shown as 1116-A as a ¼:¾ blend between the object and the background pixels. The interpolated frame now includes two interpolated versions of the original object, with different opacity to the object in the input frames, and located in the wrong position. Interpolation using non-true motion vectors therefore still causes visual artefacts in interpolated frames. However, the artefacts that arise after a working scale factor is applied to change the relative visibility of the object at different time instances are significantly less visible than the artefacts introduced by interpolating at the ideal time instance.

Conveniently, the introduction of a working scale factor that shifts the working time instance closer to the input frames biases the interpolated frame to look more like the input frame that it is shifted towards. In areas where poor motion estimation occurs this is often a better alternative than interpolating at the ideal time instance, since the quality of the output image will be improved.

FIG. 12 illustrates the differences in artefact visibility using conventional motion compensated interpolation methods and using the modified method described here. In this example, the output frame rate is 3× the input frame rate, requiring two interpolated frames at ideal time instances ⅓ and ⅔ of the time instance between source frames. FIG. 12-A shows the input frames. FIG. 12-B shows the perfect result where a true motion vector is used to interpolate the object at the ideal time instances.

FIG. 12-C shows a possible result of using incorrect or non-true motion vectors to interpolate objects at the ideal time instances. The incorrect/non true motion vectors are the same as shown in FIG. 11. These motion vectors give rise to multiple interpolations of the object in the wrong locations. The interpolations of the object are generated from a blend between the object pixels and the background pixels with an opacity determined by the ideal time instance of the interpolated frames as previously shown in FIG. 7. The interpolated object to the left of interpolated frame #1 is created by a ⅔:⅓ weighted blend between the object pixels and the background pixels due to the ideal time instance of t=⅓. The interpolated object to the right of interpolated frame #1 is created by a ⅔:⅓ weighted blend between the background pixels and the object pixels due to the ideal time instance of t=⅓. Similarly, the interpolated object to the left of interpolated frame #2 is created by a ⅓:⅔ weighted blend between the object pixels and the background pixels due to the ideal time instance of t=⅔. The interpolated object to the right of interpolated frame #1 is created by a ⅓:⅔ weighted blend between the background pixels and the object pixels due to the ideal time instance of $t=\frac{2}{3}$. These interpolated pixels have a relatively high visibility at their incorrect locations.

FIG. 12-D shows the improved result of using the same non-true motion vectors as shown in FIG. 12-C, in a system using a working scale factor of 0.5 to shift the working time instance of interpolated frames toward the input frame nearest to the interpolated frame's ideal time instance. The working time instance of interpolated frame #1 is therefore $t=\frac{1}{6}$, calculated from the ideal time instance of $t=\frac{1}{3}$, and the working time instance of interpolated frame #2 is $t=\frac{5}{6}$, calculated from the ideal time instance of $t=\frac{2}{3}$. In this modified system, the interpolated frames show blended interpolations of the object with the blended interpolations closest to the original positions of the object in the source frames being more visible. Conversely, the blended interpolations furthest from the original positions of the object are less visible. The interpolated object to the left of interpolated frame #1 is created by a $\frac{5}{6}$:$\frac{1}{6}$ weighted blend between the object pixels and the background pixels due to the working time instance of $t=\frac{1}{6}$. Similarly, the interpolated object to the right of interpolated frame #1 is created by a $\frac{5}{6}$:$\frac{1}{6}$ weighted blend between the background pixels and the object pixels. Interpolated frame #2 is created in the same way, using $\frac{1}{6}$:$\frac{5}{6}$ weighted blends.

While two blended interpolations of the object are still visible in incorrect locations, the working time instance interpolation causes interpolated objects which are close to the location of the original source frame objects (and therefore close to the true motion path of the object) to have increased visibility, while interpolated objects far from the location of the original source frame objects (and therefore far from the true motion path of the object) to have their visibility decreased.

In the examples so far, a working scale factor has been provided explicitly as a constant which affects all frames and all parts of frames equally. While the embodiments as described so far serve to reduce the visibility of artefacts in regions of poor motion estimator performance, it may also reduce the smoothness of interpolated video in regions where the motion estimator does perform well. In practice significant improvements in the smoothness of interpolated video can still be observed, and a satisfactory compromise between interpolation performance and artefact reduction can generally be found, even with a constant working scale factor.

For further improvements in performance it is proposed that the working scale factor may also be determined by the performance of the motion estimator either globally or locally within a frame. A wide range of metrics may be used to determine how well a motion estimator is performing. For example, for a global measure of motion estimator performance we may count the number of blocks for which the SAD value of the best match found by the motion estimator was above a certain threshold. Essentially, if the motion estimator is considered to be performing well then a working scale factor close to 1.0 may be used. As the quality of motion estimation decreases, likely due to complex motions, the vector field produced becomes less reliable and a lower working scale factor may be desirable to reduce the visibility of artefacts. The limiting case occurs when a working scale factor of 0.0 is applied and the system will repeat input frames to produce the correct number of frames in the output sequence. This frame repeat case provides a safe, artefact-free state for very poor motion estimation but will lose the benefits afforded by motion compensated frame interpolation. The ability of the proposed scheme to perform a smooth transition from ideal motion compensated frame interpolation to frame repetition is a desirable feature.

Figure 13:
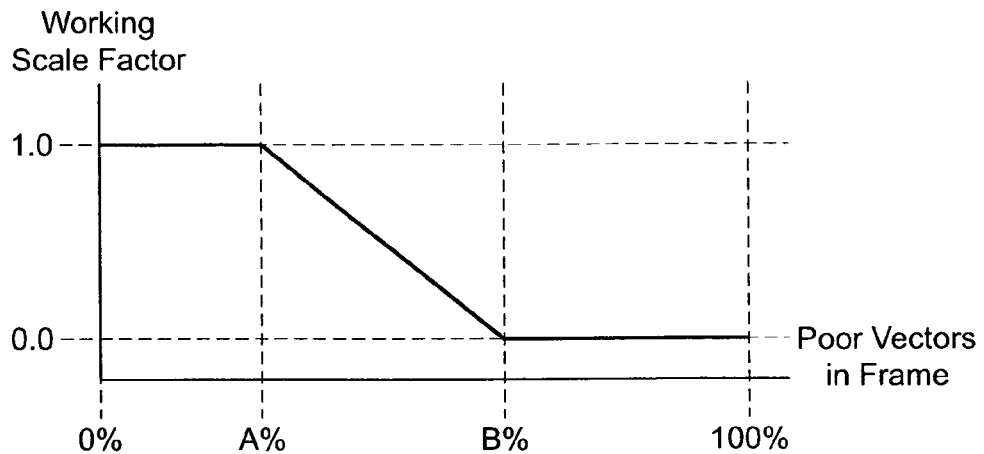
FIG. 13 illustrates an example determination of the working scale factor based on the performance of the motion estimator.

FIG. 13 illustrates a suitable method of determining a working scale factor value from the performance of the motion estimator. In this example the proportion of the vectors in the vector field that are considered to give a poor match between source frame pixels is used to generate a single working scale factor metric for every block in the frame. Between 0% poor vectors in the frame and a user defined threshold A % poor vectors in the frame, the working scale factor is set as 1.0. In this region, the performance of the motion estimator is considered good and therefore the working time instance should not be scaled back from the ideal time instance. In the region from a second user defined threshold B % poor vectors in the frame to 100% poor vectors in the frame, the performance of the motion estimator is considered unacceptable and therefore it is safer to output repeated frames than to use the motion compensated interpolated frames. This is achieved by setting the working scale factor to 0.0. In the region between user defined thresholds A % poor vectors in the frame and B % poor vectors in the frame, the motion estimator is considered to be unreliable and a working scale factor between 1.0 and 0.0 is required. This simple example could readily be modified to use, for example, an alternative motion estimation performance metric, a non-linear ramping function, multiple thresholds with different ramp functions, etc.

Figure 14:
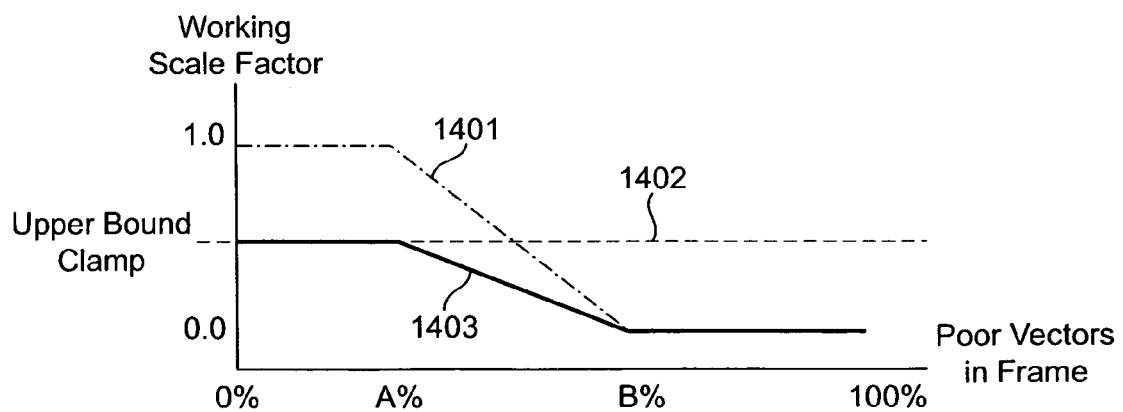
FIG. 14 illustrates an example determination of the working scale factor based on the performance of the motion estimator and a clamping scale factor.
Figure 15:
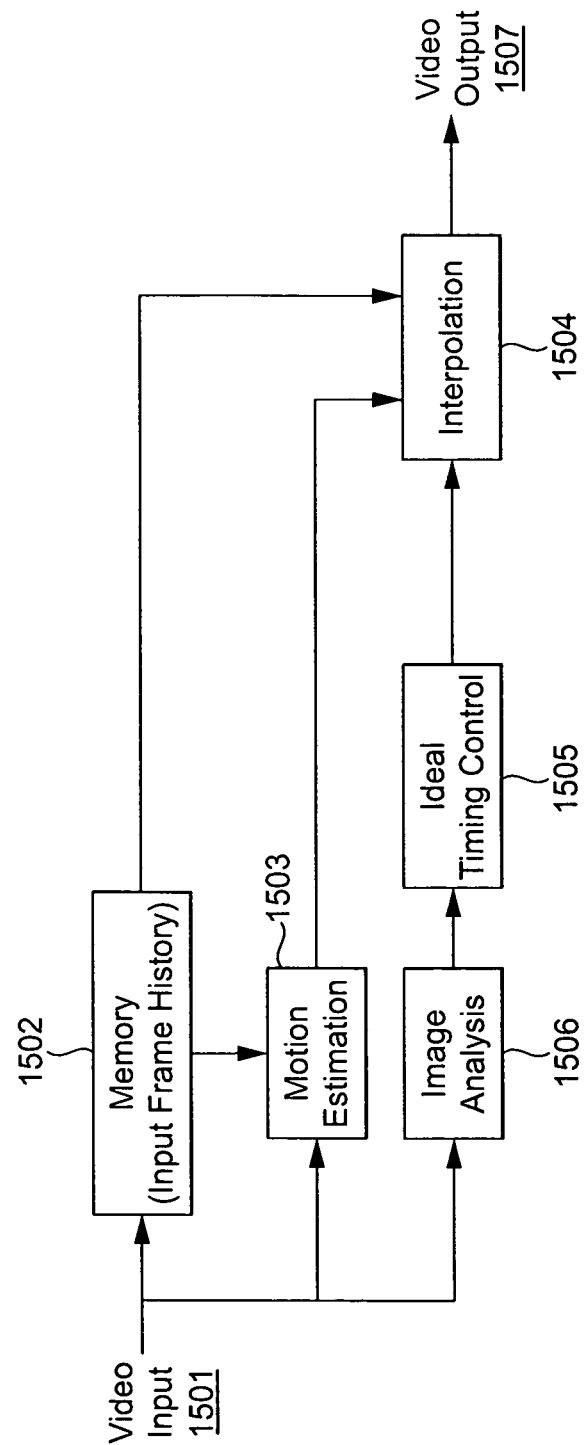
FIG. 15 is the block diagram of a conventional motion compensated frame rate conversion system.

In FIG. 13, the working scale factor was varied between 0.0 and 1.0. A useful modification to this system is to specify constant scale factors as clamping values for the upper and lower bounds. FIG. 14 illustrates an extension to the method of determining a working scale factor from the performance of the motion estimator and from an explicitly defined upper bound clamping scale factor. 1401 shows the function for determining a scale factor based on the performance of a motion estimator as previously shown in FIG. 13. 1402 shows an explicitly defined upper bound clamping scale factor of approximately 0.5. 1403 shows the final working scale factor function as the product of the two scale factors. Between 0% poor vectors in the frame and a user defined threshold A % poor vectors in the frame, the working scale factor is set to the upper bound clamping scale factor. In the region from a second user defined threshold B % poor vectors in the frame to 100% poor vectors in the frame, the performance of the motion estimator is considered unacceptable and therefore it is safer to output repeated frames than to use the motion compensated interpolated frames. In the region between user defined thresholds A % poor vectors in the frame and B % poor vectors in the frame, the motion estimator is considered to be unreliable and a working scale factor between the upper bound clamping scale factor and the lower bound clamping scale factor is required. The introduction of clamping scale factors to the function has, in this example, been used to shift the working time instances used in interpolation towards the input frame time instances, i.e. the system is more conservative and will have fewer visual artefacts. It may also be desirable to apply a lower bound clamping scale factor to ensure the system always introduces some amount of smoothing to the output frames.

Conveniently, the working scale factor may be derived from a combination of explicitly defined clamping scale factors and from the performance of the motion estimator. The final working scale factor may be selected as the minimum/maximum/average of the two values or may be calculated by an arithmetic function. Suitable arithmetic functions may include, but are not limited to, the product or the sum of the two scale factors.

Figure 16:
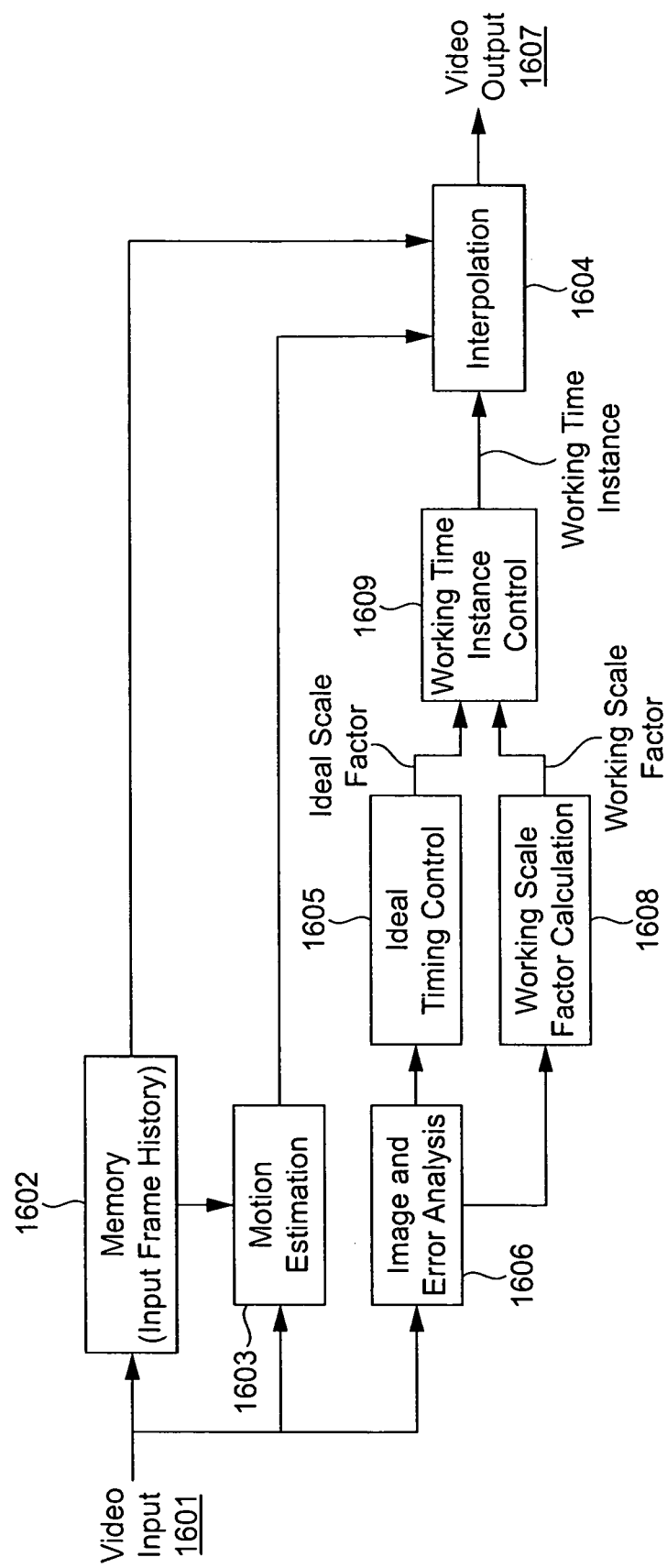
FIG. 16 is the block diagram of a motion compensated frame rate conversion system modified to include varying temporal interpolation.

A block diagram of a frame rate conversation system modified according to this invention is shown in FIG. 16. The system comprises a video input 1601 which goes to a memory 1602 to store the input frame history and also to a motion estimation unit 1603 which performs motion estimation by comparing the current input frame from the video input 1601 with a previous frame from the memory 1602. Motion vectors are sent to an interpolation unit 1604 which constructs an interpolated frame from the input frames and provides a video output 1607. An ideal timing control unit 1605 calculates the ideal time instances for the interpolated output frames. An image and error analysis unit 1606 may monitor the performance of the motion estimator for use in the working scale factor calculation to determine how well it is performing either on a block by block basis or a whole picture basis. An output dependant on the motion estimation is provided to a working scale factor calculation 1608. This uses the received signal to determine a working scale factor which is then used by the working time instance control unit 1609 to provide an adjusted interpolation time to be used by the interpolation unit 1604. The unit 1608 may determine the working scale factor between clamped upper and lower values.

The invention claimed is:

1. A method for motion compensated video interpolation, comprising:
   determining, in a motion estimator, for each block in a current video field or frame, the current field or frame being from a sequence, a motion vector that produces a best match to a pixel data area in a previous video field or frame of the sequence;
   forming a motion vector field for the current video field or frame using the thus determined best match vectors for each block of the current video field or frame;
   determining a first time instance, within the sequence, at which an interpolated block in an interpolated video field or frame must be displayed, the first time instance being between when the current and previous video fields or frames must be displayed;
   interpolating video data, in an interpolator, from the current and previous video fields or frames, for each block of the interpolated video field or frame, the interpolating comprising selecting video data from the current and previous video fields or frames according to the motion vector field, and combining the selected video data according to a respective working time instance for that block, which is variable between times when the current and previous video fields or frames must be displayed;
   combining the interpolated blocks to produce the interpolated frame or field; and
   outputting the interpolated frame or field for display at the first time instance or for storage and subsequent display at the first time instance, relative to the current and previous fields or frames in the sequence, wherein the working time instance of the interpolated field or frame is time shifted either towards a time instance for display of the previous input field or frame or towards a time instance for display of the current input field or frame.

2. A method according to claim 1, wherein the determining of the respective working time instances for the interpolated blocks of the interpolated field or frame comprises determining the same working time instance for all blocks in the interpolated field or frame.

3. A method according to claim 1, further comprising determining the respective working time instance for each block in the interpolated field or frame independently of the other blocks in the interpolated field or frame.

4. A method according to claim 1, wherein the determining of each working time instance comprises applying a scale factor to the respective first time instance for the block.

5. A method according to claim 4, further comprising determining the scale factor in dependence on the performance of the motion estimator.

6. A method according to claim 4, further comprising clamping the scale factor using upper and lower clamping scale factors.

7. A method according to claim 5, wherein a working scale factor is derived from both the scale factor determined by the performance of the motion estimator and provided clamping scale factor values.

8. A method according to claim 4, wherein the scale factor is determined in dependence on the performance of the motion estimator and provided upper and/or lower clamping scale factor values.

9. A method according to claim 1, wherein the working time instance of the interpolated field or frame is shifted towards an input field or frame that is nearest to the interpolated field or frame's first time instance.

10. Apparatus for motion compensated video interpolation comprising: a motion estimator configured for determining, for each block in a current video field or frame, a motion vector that produces a best match to a pixel area in a previous video field or frame, the motion vectors for all the blocks of the current video field or frame forming a motion vector field for the current video field or frame;
    a first timing controller configured for determining a first time instance at which an interpolated block of a video field or frame must be displayed;
    a second timing controller configured for determining a respective working time instance for each interpolated block in the interpolated field or frame, each working time instance being variable between the times when the current and previous video fields or frames must be displayed wherein the working time instance of the interpolated field or frame is time shifted either towards a time instance for display of the previous input field or frame or towards a time instance for display of the current input field or frame;
    an interpolator configured for interpolating video data for each interpolated block based on its respective working time instance and using the motion vector field; and
    an output unit configured for storing or displaying the interpolated frame or field, so that the interpolated field or frame, when displayed, will be displayed at the determined first time instance, relative to the display of the current and previous video fields or frames.

11. Apparatus according to claim 1 the second timing controller is configured to determine, for each block of the interpolated field or frame, the same working time instance.

12. Apparatus according to claim 10, wherein the second timing controller is configured to determine the working time instance for each block in the interpolated field or frame independently of the other blocks in the interpolated field or frame.

13. Apparatus according to claim 10, wherein the second timing controller is configured to determine each of the working time instances by applying a scale factor to the first time instance.

14. Apparatus according to claim 13 further comprising an error estimator configured for determining errors in motion estimation and a scale factor determiner configured for determining the scale factor in dependence on the determined errors.

15. Apparatus according to claim 13 wherein the scale factor determiner is configured to derive the scale factor between upper and lower clamping scale factor values.

* * * * *